United States Patent
Lin et al.

(10) Patent No.: US 8,621,718 B2
(45) Date of Patent: Jan. 7, 2014

(54) ASSEMBLY FIXTURE FOR ASSEMLING A HINGE TO A DISPLAY PANEL

(75) Inventors: Ju-Shan Lin, New Taipei (TW); Te-Jen Sung, New Taipei (TW); Shi-Wei Shi, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 302 days.

(21) Appl. No.: 13/217,301

(22) Filed: Aug. 25, 2011

(65) Prior Publication Data
US 2013/0031750 A1    Feb. 7, 2013

(30) Foreign Application Priority Data
Aug. 1, 2011  (CN) .......................... 2011 1 0217926

(51) Int. Cl.
*E05D 5/00* (2006.01)
*E05D 7/10* (2006.01)

(52) U.S. Cl.
USPC .......................... 16/382; 16/254; 361/679.27

(58) Field of Classification Search
USPC ........... 16/382, 366, 369, 254, 257, 259, 260, 16/261, 266; 361/679.08, 679.11, 679.02, 361/679.15, 679.27; 455/90.3, 575.1, 455/575.3, 575.8; 379/433.12, 433.13; 348/373, 333.01, 333.06, 794
See application file for complete search history.

(56) References Cited

U.S. PATENT DOCUMENTS

| | | | |
|---|---|---|---|
| 6,382,577 B1 * | 5/2002 | McCoy et al. | 248/284.1 |
| 7,421,762 B2 * | 9/2008 | Lu et al. | 16/328 |
| 7,478,789 B2 * | 1/2009 | Yukawa et al. | 248/371 |
| 7,885,059 B2 * | 2/2011 | Kim et al. | 361/679.21 |
| 2004/0012920 A1 * | 1/2004 | Tanimoto et al. | 361/683 |
| 2006/0039103 A1 * | 2/2006 | Wang et al. | 361/679 |
| 2006/0274487 A1 * | 12/2006 | Wang et al. | 361/681 |
| 2007/0130729 A1 * | 6/2007 | Lee | 16/382 |
| 2007/0230095 A1 * | 10/2007 | Wu | 361/679 |
| 2007/0277349 A1 * | 12/2007 | Yu | 16/320 |
| 2009/0316348 A1 * | 12/2009 | Tseng et al. | 361/679.28 |
| 2010/0172073 A1 * | 7/2010 | Shen et al. | 361/679.01 |
| 2012/0194978 A1 * | 8/2012 | Huang et al. | 361/679.01 |

* cited by examiner

*Primary Examiner* — Chuck Mah
(74) *Attorney, Agent, or Firm* — Altis Law Group, Inc.

(57) ABSTRACT

An assembly fixture used to assemble hinges to a display panel assembly includes a base to support the display and at least one hinge mounting member fixed on the base. Each hinge mounting member includes two support bars projected from the base, a axle and a rotatable arm. The opposite ends of the axle respectively rotatably connected to the tops of the two support bars. The rotatable arm can rotated in concert with the axle. Each rotatable arm further includes at least two protruding portions to position the hinge and at least one magnetic element to attract the hinge, thereby fixing the hinge to the rotatable arm.

6 Claims, 3 Drawing Sheets

ASSEMBLY FIXTURE FOR ASSEMLING A HINGE TO A DISPLAY PANEL

BACKGROUND

1. Technical Field

The present disclosure relates to assembly fixtures and, particularly, to an assembly fixture used to assemble a hinge to a display panel of an electronic device.

2. Description of Related Art

Many electronic devices, such as notebooks, have a display connected to the main body via hinges. For increasing productivity, an assembly fixture is desired to fix the hinges to the display.

BRIEF DESCRIPTION OF THE DRAWINGS

Many aspects of the present disclosure should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will now be described in detail, with reference to the accompanying drawings.

Figure 1:
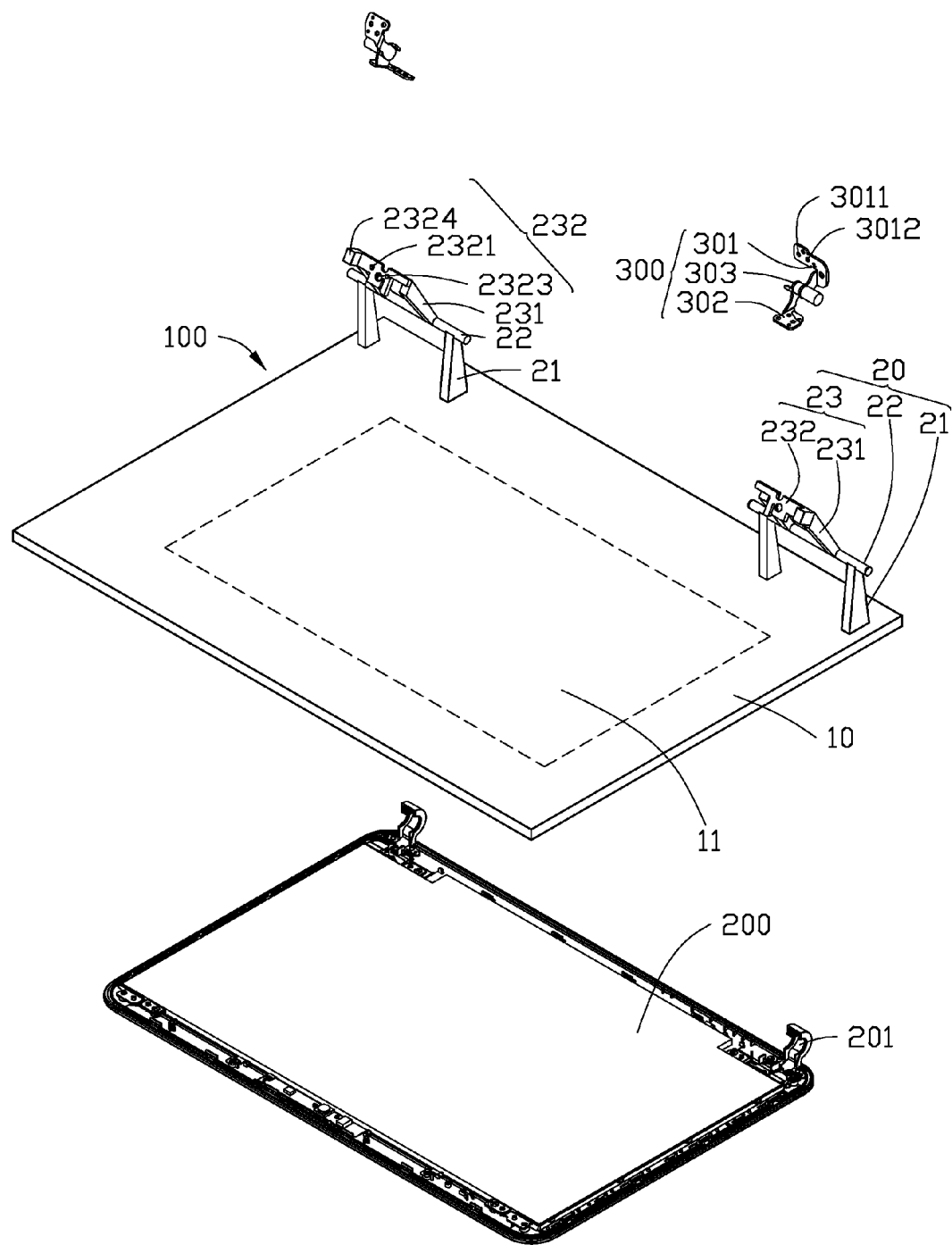
FIG. 1 is an isometric view of an assembly fixture in accordance with an exemplary embodiment.
Figure 2:
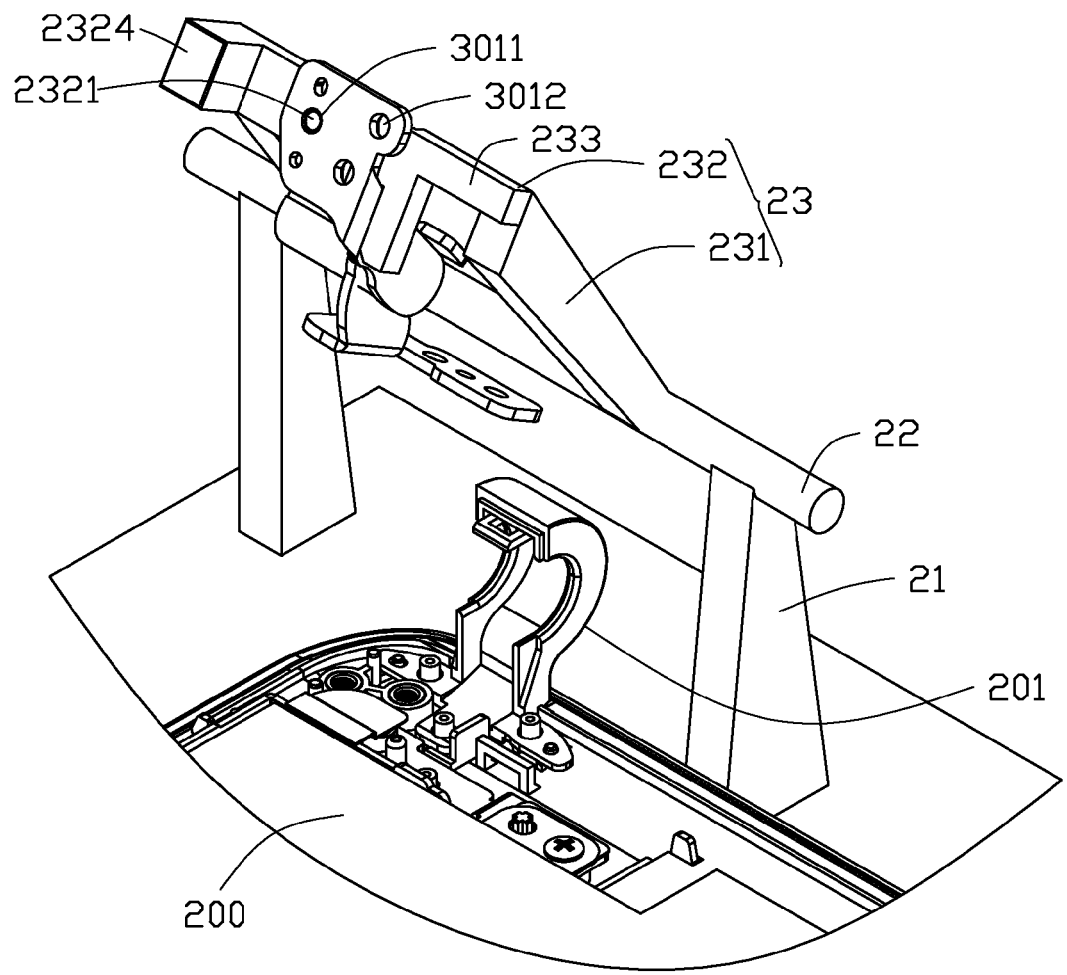
FIG. 2 is an enlarged isometric view of a hinge mounting member of the assembly fixture of FIG. 1 in a first position before assembling a hinge to a display panel assembly.

Referring to FIGS. 1 and 2, an assembly fixture 100 used to assemble hinges 300 to a display panel assembly 200 of an electronic device (not shown) is disclosed. Two hinge catches 201 protrude from an edge of the display 200 at opposite ends thereof.

The fixture 100 includes a base 10 and two hinge mounting members 20. In this embodiment, the base 10 is a flat plate for supporting the display 200. The base 10 further defines a recessed receiving space 11 to receive and position the display 200.

The two hinge mounting members 20 protrude from the base 10. Each hinge mounting member 20 includes two support bars 21, an axle 22, and a rotatable arm 23. The axle 22 includes two opposite ends rotatably connected to the tops of the two support bars 21.

The rotatable arm 23 is fixed to the axle 22 and can rotate in concert with the axle 22. Each rotatable arm 23 includes two connecting bars 231 and a hinge positioning member 232. The connecting bars 231 protrude from the lateral surface of the axle 22. The hinge positioning member 232 is substantially parallel to the axle 22 and includes two ends respectively fixed to the free ends of the connecting bars 231. Each hinge positioning member 232 includes at least two protruding portions 2321 protruding from an outer surface 233 of the hinge positioning member 232 to position the hinge 300, and at least one magnetic element 2322 to fix the hinge 300 to the hinge positioning member 232. Each hinge positioning member 232 further defines at least one through hole 2323 in the surface 233, and a stopper portion 2324 protruding from the surface 233. In this embodiment, the magnetic element 2322 is a magnet, and the hinges 300 are made of ferromagnetic material.

Each hinge 300 includes a first connecting portion 301, a second fixing portion 302, and an axle 303. The first connecting portion 301 and the second fixing portion 302 can rotate about the axle 303. The first connecting portion 301 is connected to the display 200 and the second fixing portion 302 is connected to a main body (not shown), such that the display 200 can rotate with respect to the main body. The first connecting portion 301 includes a planar structure defining at least two positioning holes 3011 and at least one threaded hole 3012.

During assembly, each hinge 300 is positioned by the at least two protruding portions 2321 of the rotatable arm 23 extending through the at least two position holes 3011 of the first connecting portion 301 of the hinge 300. The at least one magnetic element 2322 attracts the hinge 300, thereby fixing the hinge 300 to the rotatable arm 23. The hinge 300 can thus rotate together with the rotatable arm 23. When the hinge 300 is fixed to the rotatable arm 23, the through hole 2323 of the rotatable arm 23 is aligned with the threaded hole 3012.

Figure 3:
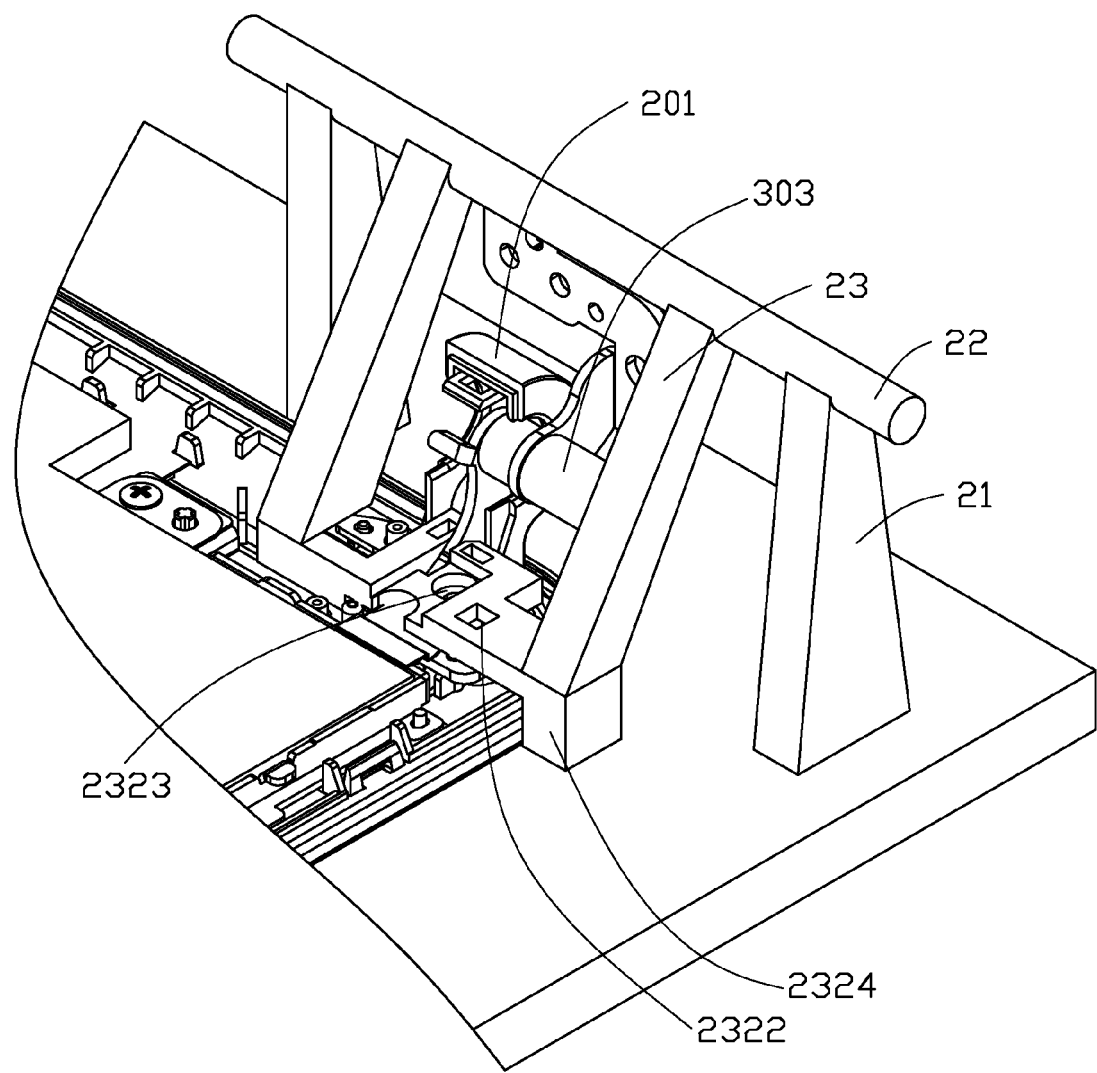
FIG. 3 is an isometric view of the hinge mounting member of FIG. 2 in a second position where the hinge is ready to be assembled to the display panel assembly.

Referring to FIG. 3, when the hinge 300 rotates together with the rotatable arm 23 from a first position shown in FIG. 2 to a second position shown in FIG. 3, the stopper portions 2324 of the two hinge mounting members 20 press against the display 200 positioned in the receiving space 11 of the base 10, thereby limiting the movement of the display 200. The axle 303 of each hinge 300 is received in an opening of each arcuate hinge catch 201, and the first connecting portion 301 of the hinge 300 stays in tight contact with the display 200. A screw (not shown) can pass the through hole 2323 and be screwed into the threaded hole 3012, thereby fixing the hinge 300 to the display 200.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An assembly fixture for assembling a hinge to a display panel assembly, comprising:
   a base for supporting the display panel assembly; and
   at least one hinge mounting member fixed on the base, and each said mounting member comprising:
   two support bars protruding from the base;
   an axle rotatably connected to the two support bars;
   a rotatable arm fixed to the axle, said rotatable arm comprising at least two protruding portions for positioning a connecting portion of the hinge, and at least one magnetic element for fixing the connecting portion of the hinge to the rotatable arm.

2. The assembly fixture as described in claim 1, wherein the base is a flat plate defining a recessed receiving space to receive and position the display.

3. The assembly fixture as described in claim 1, wherein each rotatable arm comprises two connecting bars and a hinge positioning member, the connecting bars protrude from the lateral surface of the axle, the hinge positioning member is substantially parallel to the axle and includes two ends respectively fixed to the free ends of the connecting bars, and
   wherein said hinge positioning member includes said at least two protruding portions and said at least one magnetic element.

4. The assembly fixture as described in claim 3, wherein the at least two protruding portions and the at least one magnetic element are defined on an outer surface of the hinge positioning member.

5. The assembly fixture as described in claim 4, wherein the outer surface of the hinge positioning member of each hinge mounting member further defines at least one through hole for fixing the connecting portion of the hinge to the display and a stopper portion protruding from the outer surface for limiting the movement of the display supported in the base.

6. The assembly fixture as described in claim 1, wherein the magnetic element is a magnet.

\* \* \* \* \*